April 2, 1929.  W. J. GIBBONS  1,707,932
NUT LOCK
Filed June 1, 1928
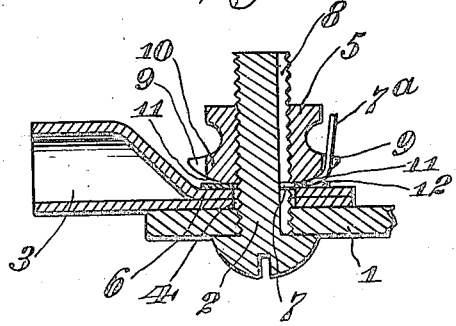
Inventor
William J. Gibbons
By Cyrus N. Anderson
Attorney Patented Apr. 2, 1929.

1,707,932

UNITED STATES PATENT OFFICE.

WILLIAM J. GIBBONS, OF PHILADELPHIA, PENNSYLVANIA.

NUT LOCK.

Application filed June 1, 1928. Serial No. 282,097.

My invention relates to locking devices for nuts and bolts of the character described and claimed in my co-pending application, Serial Number 237,209, filed December 2, 1927, and this application contains matter found therein.

The general object of my invention is to provide a nut lock which is adapted to be employed for the fastening of nuts of different diameters to screws and bolts.

A further object of the invention is to provide a novel nut lock of the character indicated adapted to prevent relative rotation between the nut and the bolt or screw to which it is attached.

Another object of the invention is to provide a nut lock of novel construction adapted to be employed in securing nuts to the bolts or screws to which they are attached and which is so constructed that it may be employed in fastening nuts of different diameters in the manner already indicated.

It also is an object of my invention to provide a locking device of novel character comprising a washer which may be interposed between a nut and one of the members which are secured together by the nut and screw or bolt, which washer is provided with a tongue adapted to be bent into engagement with the nut, the latter being so constructed and arranged as to reduce the possibility of fracture of the tongue, thereby lengthening the life of the lock washer.

Further objects and advantages which may be derived from my invention will be pointed out in the following description or will be apparent therefrom.

In order to more fully comprehend the nature of the invention reference may be had to the accompanying drawing in which I have illustrated certain embodiments thereof. But it is to be understood that the invention is susceptible to embodiment in forms of construction other than those which are shown and that various changes may be made in the details of construction without departing from the invention as defined in the claim.

In the said drawings:

Fig. 1 represents a longitudinal sectional view of electric contact devices secured together by a nut and locking device embodying the invention;

Fig. 2 is a view in perspective of the locking device employed in connection with the nut and screw;

Fig. 3 is a view in perspective of the screw shown in Fig. 1;

Fig. 4 is a top plan view of a modified form of construction embodying the locking means of my invention;

Fig. 5 is a view in longitudinal section taken on the line 5—5 of Fig. 4; and

Fig. 6 is a view partly in section and partly in front elevation of another modified construction embodying the locking means of my invention.

In Fig. 1 I have shown my improved and novel lock nut applied to a nut and bolt which are adapted to secure together a pair of electric connectors. In the said figure the plate 1 represents the portion of a switch structure or the like which plate is provided with a tapped opening adapted to receive the shank of the screw 2 as shown. An electric terminal 3 having an opening 4 therein is placed upon the upper side of the said plate over the shank of the screw 2 projecting therefrom. A nut 5 which is threaded upon the shank of the said screw is secured against rotation by means of a nut lock or lock washer designated generally at 6 and having a pair of tongues 7 and 7ᵃ formed thereon, which washer is interposed between the under side of the nut and upper side of terminal 3 and around the shank of the said screw. For convenience in stamping, the tongues 7ᵃ and 7 may be formed on the annulus on a common radial line through the latter, as shown in Fig. 2.

The tongue 7 which projects inwardly from the inner edge of the said washer engages a longitudinal slot 8 formed in the shank of the screw, while the tongue 7ᵃ is adapted to be bent upwardly into one of a plurality of slots 9 formed in the flange 10 of the nut, the said tongue being bent into engagement with the rounded portion 11 formed upon the outer under side of the said nut. A pair of slots 12 are formed, one on each side of the tongue 7ᵃ, as is clearly shown, by virtue of which the lock washer may be employed in securing nuts of different diameters on screws of the same diameter. In the manufacture of lock washers of this character it has been found necessary to maintain a large stock of lock washers on hand to supply the demands for lock washers of different external diameters but of the same internal diameter, and in the devices heretofore constructed it has not been feasible to employ a washer of a given size in fastening nuts of different sizes, because the tongues have not been so connected to the washers as to enable them to be bent into proper engagement with nuts of different diameters. By providing the slots 12 in the lock washer such lock washer may be employed instead of a plurality of lock washers of the same internal diameter but of different external diameters. A material saving in the manufacture of lock washers is thereby effected.

The function of the rounded portion 11 upon the under side of the nut 5 is to prevent the tongue 7ᵃ from being bent at too sharp an angle and also to make it unnecessary to completely flatten the tongue 7ᵃ in order to release the nut 5. Experience has shown that such a construction results in greatly increasing the life of lock washers, particularly those employed in making electric connections, which connections are frequently fastened and unfastened.

In the construction shown in Figs. 4 and 5 a bolt 13 is employed to secure together plates 14 and 15, the said bolt being projected through oversized openings formed in the said plates, as is clearly shown. A nut 16 is threaded upon the outer end of the said bolt, said nut having a flange 17 provided with a plurality of slots 18 therein with one of which the tongue 7ᵃ of the nut lock is adapted to engage. The bolt is further provided with a longitudinal slot 19 which receives the tongue 7 of the said lock washer. The under side of the nut is rounded, as shown at 20, in the same manner as nut 5 of Fig. 1 and for the same purpose. The manner in which the nut and bolt and nut lock are assembled will be obvious.

It will be apparent that the tongue 7 of the nut lock which engages the longitudinal slots 8 and 19 of Figs. 1 and 5, respectively, prevents rotation of the lock washer which in turn prevents rotation of either of the nuts 5 or 16 to which it may be attached by means of the tongue 7ᵃ which engages one of the slots of the said nuts.

Fig. 6 illustrates the manner in which a locking device embodying my invention may be employed to advantage in connecting a high tension terminal to a spark plug. In the said figure the spark plug 21 is provided with the usual screw or stud 22 the shank of which is longitudinally slotted, as shown at 23. A terminal 24 is adapted to be secured to the spark plug by means of a nut 25 which nut is similar to the nut 5 of Fig. 1. Rotation of the nut is prevented by means of a nut lock such as is illustrated in Fig. 2, which is interposed between the nut and the adjacent portion of the terminal in the same manner as in Figs. 1 and 5, the tongue 7ᵃ engaging one of the slots 9 formed in the nut and the tongue 7 projecting into the slot 23 of the screw or stud 22.

It will be noted that by merely bending the tongue 7ᵃ downwardly in each of the constructions shown until the rounded portion of the nut is able to pass thereover the nut may be unscrewed. In devices of this character as heretofore constructed it has been necessary to bend the tongues of such nut locks until they were positioned in the plane of the bottom of the nut, and frequent bending to such an extent is sufficient to quickly break the tongues from the lock washers. By providing a nut having the under side thereof rounded, as shown in Figs. 1, 5 and 6, the possibility of the fracture of the tongues at the point of bending is almost entirely eliminated because the tongue is bent through a relatively small angle and the bend in the tongue will be of comparatively large radius. Failures practically are eliminated in the use of my improved nut lock.

It will be seen that I have provided a nut lock of novel construction which is adapted to be employed in locking nuts of different external diameters in lieu of a plurality of washers of different external diameters. A material saving in the manufacture of nut lock is thereby effected.

Having thus described my invention, what I claim and desire to secure by Letters Patent is:

In locking means of the character described, the combination of an annulus having an outwardly projecting tongue connected thereto at a point intermediate the inner and outer edges thereof, a member extending through the opening formed in said annulus said member having a slot formed therein, an inwardly projecting tongue formed on said annulus adapted to engage said slot whereby rotation of said annulus relative to the said member is prevented, a nut connected to said member having a plurality of notches formed therein, the outer portion of the under side of said nut being rounded throughout the entire peripheral extent thereof, the said first named tongue being of sufficient length to permit the said tongue to be bent into engagement with the said rounded portion and with one of said notches to positively lock the said nut against rotation relative to the said member.

In testimony that I claim the foregoing as my invention I have hereunto signed my name this 31 day of May, A. D. 1928.

WILLIAM J. GIBBONS.